(12) United States Patent
Kamoshita et al.

(10) Patent No.: US 12,434,696 B2
(45) Date of Patent: Oct. 7, 2025

(54) TRAJECTORY GENERATION DEVICE, TRAJECTORY GENERATION METHOD, AND COMPUTER PROGRAM PRODUCT

(71) Applicant: DENSO CORPORATION, Kariya (JP)

(72) Inventors: Yuta Kamoshita, Kariya (JP); Keigo Fujimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 456 days.

(21) Appl. No.: 17/812,569

(22) Filed: Jul. 14, 2022

(65) Prior Publication Data

US 2022/0348198 A1     Nov. 3, 2022

Related U.S. Application Data

(63) Continuation of application No. PCT/JP2020/048191, filed on Dec. 23, 2020.

(30) Foreign Application Priority Data

Jan. 17, 2020    (JP) .............................. 2020-006258

(51) Int. Cl.
     *B60W 30/095*     (2012.01)
     *B60W 50/00*      (2006.01)
     *B60W 60/00*      (2020.01)

(52) U.S. Cl.
     CPC .... *B60W 30/0956* (2013.01); *B60W 50/0097* (2013.01); *B60W 60/001* (2020.02)

(58) Field of Classification Search
     CPC ......... B60W 20/0956; B60W 50/0097; B60W 60/001
See application file for complete search history.

(56) References Cited

U.S. PATENT DOCUMENTS

| | | | |
|---|---|---|---|
| 2018/0203454 A1 | 7/2018 | Aoki et al. | |
| 2018/0211532 A1 | 7/2018 | Aoki et al. | |
| 2018/0218600 A1 | 8/2018 | Fujita | |
| 2018/0218601 A1 | 8/2018 | Aoki et al. | |
| 2018/0231974 A1* | 8/2018 | Eggert | B60W 30/085 |
| 2018/0345963 A1* | 12/2018 | Maura | B60W 60/0011 |

(Continued)

FOREIGN PATENT DOCUMENTS

JP     2018-95149 A    6/2018

*Primary Examiner* — Khoi H Tran
*Assistant Examiner* — Tristan J Greiner
(74) *Attorney, Agent, or Firm* — Maschoff Brennan

(57) ABSTRACT

A trajectory generation device is configured to generate a future trajectory along which a vehicle travels in a future. The trajectory generation device includes an action plan unit, a trajectory candidate unit, a trajectory evaluation unit, and a trajectory fixing unit. The action plan unit is configured to plan a future action of the vehicle. The trajectory candidate generation unit is configured to generate a trajectory candidate of the future trajectory in accordance with the planned future action. The trajectory evaluation unit is configured to evaluate whether a traveling along the trajectory candidate is permitted. The trajectory fixing unit is configured to fix the trajectory candidate as the future trajectory when it is determined that the traveling along the trajectory candidate is permitted. The action plan unit is configured to plan the future action again when it is determined that the traveling along the trajectory candidate is not permitted.

18 Claims, 9 Drawing Sheets

(56) References Cited

U.S. PATENT DOCUMENTS

| | | | | |
|---|---|---|---|---|
| 2019/0111933 A1* | 4/2019 | Schoeggl | ............ | B60W 60/0011 |
| 2019/0155293 A1* | 5/2019 | Oniwa | .................. | B60W 30/10 |
| 2019/0346851 A1* | 11/2019 | Liu | ..................... | G05D 1/0217 |
| 2020/0174481 A1* | 6/2020 | Van Heukelom | .. | G01C 21/3407 |
| 2020/0189573 A1* | 6/2020 | King | .................. | B60R 21/0134 |

* cited by examiner

TRAJECTORY GENERATION DEVICE, TRAJECTORY GENERATION METHOD, AND COMPUTER PROGRAM PRODUCT

CROSS REFERENCE TO RELATED APPLICATION

The present application is a continuation application of International Patent Application No. PCT/JP2020/048191 filed on Dec. 23, 2020, which designated the U.S. and claims the benefit of priority from Japanese Patent Application No. 2020-006258 filed on Jan. 17, 2020. The entire disclosures of all of the above applications are incorporated herein by reference.

TECHNICAL FIELD

The present disclosure relates to a technique for generating a future trajectory on which a vehicle will travel.

BACKGROUND

A traveling assistance device configured to assist the traveling of the vehicle by the automated driving is known. The traveling assistance device is configured to select one of traveling on a set route and stopping in response to an event encountered by the vehicle, and causes the vehicle to execute the selection action.

SUMMARY

A first aspect of the present disclosure is a trajectory generation device configured to generate a future trajectory along which a vehicle travels in a future. The trajectory generation device includes: an action plan unit configured to plan a future action of the vehicle; a trajectory candidate generation unit configured to generate a trajectory candidate of the future trajectory in accordance with the planned future action; a trajectory evaluation unit configured to evaluate whether a traveling along the trajectory candidate is permitted; and a trajectory fixing unit configured to fix the trajectory candidate as the future trajectory when it is determined that the traveling along the trajectory candidate is permitted, wherein the action plan unit is configured to plan the future action again when it is determined that the traveling along the trajectory candidate is not permitted.

A second aspect of the present disclosure is a method for a processor to generate a future trajectory along which a vehicle travels in a future. The method includes planning a future action of the vehicle; generating a trajectory candidate of the future trajectory in accordance with the planned future action; evaluating whether a traveling along the trajectory candidate is permitted; fixing the trajectory candidate as the future trajectory when it is determined that the traveling along the trajectory candidate is permitted; and planning the future action again when it is determined that the traveling along the trajectory candidate is not permitted.

A third aspect of the present disclosure is a computer program product for generating a future trajectory along which a vehicle travels in a future. The computer program product is stored on at least one non-transitory computer readable medium and includes instructions configured to, when executed by at least one processor, to cause the at least one processor to: plan a future action of the vehicle; generate a trajectory candidate of the future trajectory in accordance with the planned future action; evaluate whether a traveling along the trajectory candidate is permitted; fix the trajectory candidate as the future trajectory when it is determined that the traveling along the trajectory candidate is permitted; and plan the future action again when it is determined that the traveling along the trajectory candidate is not permitted.

EMBODIMENTS

Comparative Example

Figure 1:
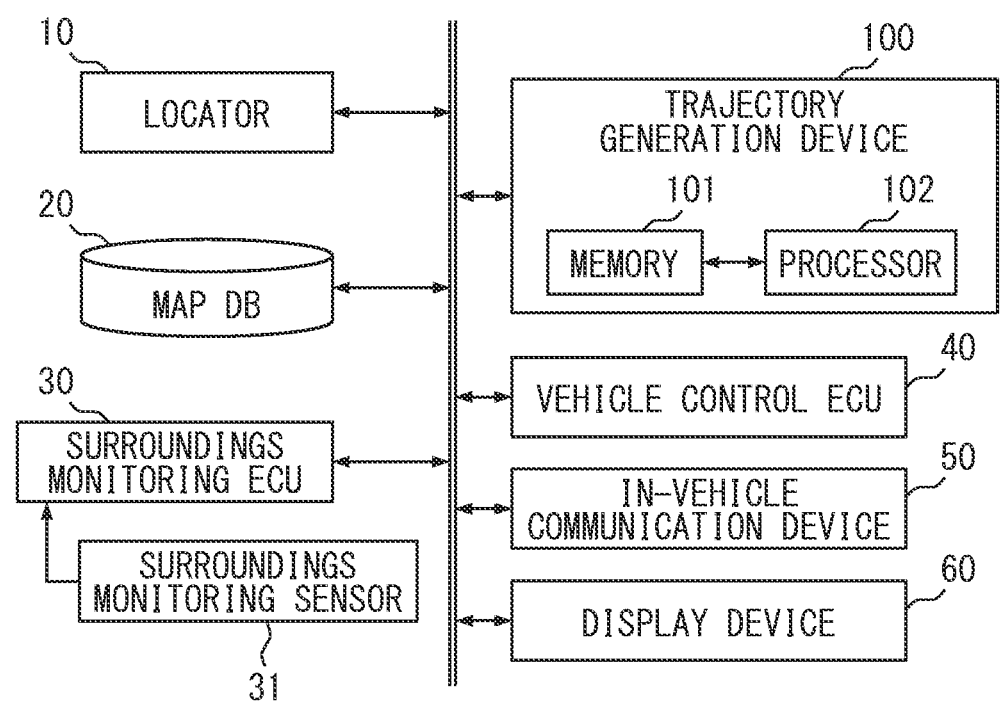
FIG. 1 is a diagram showing a system including a trajectory generation device.
Figure 2:
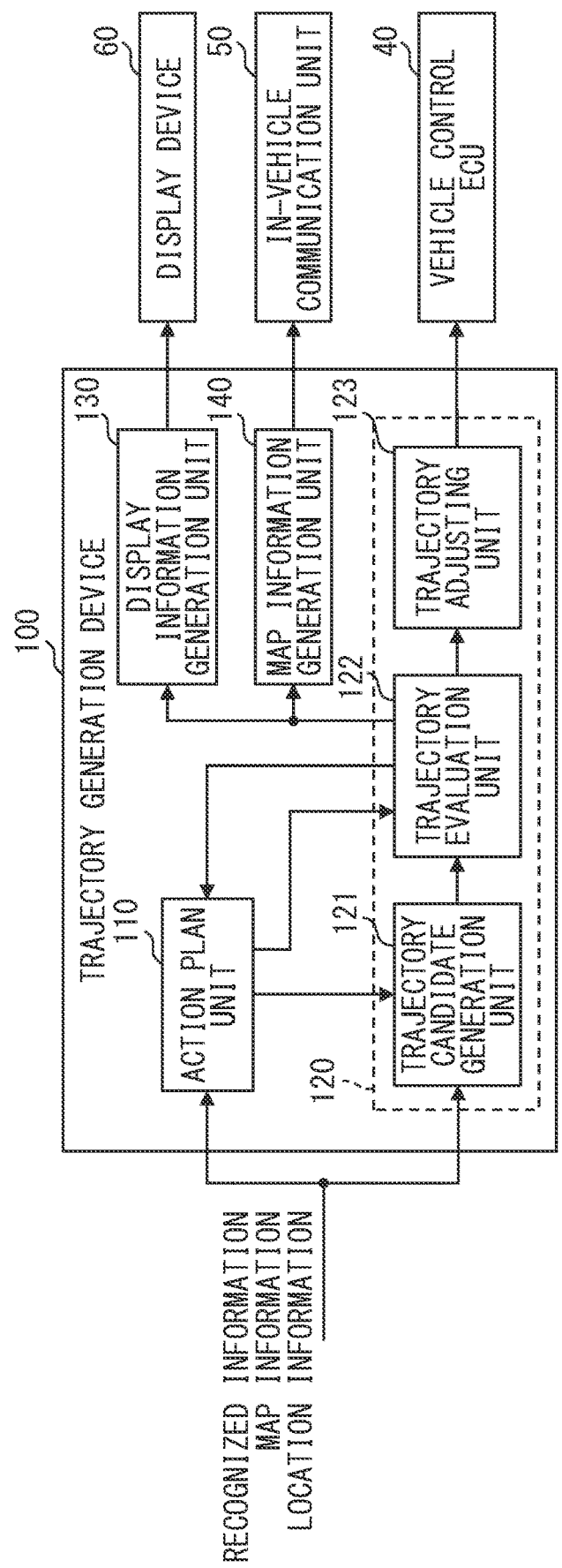
FIG. 2 is a block diagram showing an example of a function executed by the trajectory generation device.

According to a comparative example, the vehicle stops when it is determined that the traveling on the route is not permitted. Accordingly, the vehicle may stop even when the vehicle can continue traveling along another action.

First Embodiment

A trajectory generation device 100 according to a first embodiment will be described with reference to FIGS. 1-8. The trajectory generation device 100 is an electronic control device mounted on the vehicle A. The vehicle A has at least one of a driving support function that assists the driver's driving operation and an automatic driving function that can substitute the driver's driving operation. The trajectory generation device 100 is connected, through communication buses and the like, with a locator 10, a map database (DB) 20, a surroundings monitoring ECU 30, a vehicle control ECU 40, an in-vehicle communication device 50, and a display device 60.

The locator 10 includes a GNSS (Global Navigation Satellite System) receiver and an inertial sensor. The GNSS receiver is configured to receive positioning signals from multiple positioning satellites. The inertial sensor is a sensor that detects the inertial force acting on the vehicle A. The inertia sensor includes a gyro sensor and an acceleration sensor, for example. The locator 10 combines the positioning signals received by the GNSS receiver with the measurement results of the inertial sensor to sequentially detect the position of the vehicle A (hereinafter, subject vehicle position) and generate location information of the vehicle A. The vehicle position may include, for example, coordinates of latitude and longitude. The subject vehicle position may be measured using a travel distance obtained from signals sequentially output from the vehicle speed sensor mounted on the vehicle A.

The map DB 20 is a nonvolatile memory and stores map information such as link data, node data, road shapes, buildings and the like. The map information may include a three-dimensional map including feature points of road shapes and buildings. When a three-dimensional map provided by a road shape and a point group of feature points of a structure is used as map information, the locator ECU 10 may specify the subject vehicle position by using the three-dimensional map and the detection results of the surroundings monitoring sensor 31 without using the GNSS receiver. The three-dimensional map may be generated by REM (Road Experience Management) based on captured images. Further, the map information may include traffic regulation information, road construction information, meteorological information, signal information and the like. The map information stored in the map DB 20 is updated regularly or at any time based on the latest information received by the in-vehicle communication device 50.

The surroundings monitoring ECU 30 is configured by a microcomputer as a main body that includes a processor, a memory, an I/O, and buses connecting these with each other, and performs various processes by executing control programs stored in the memory. The surroundings monitoring ECU 30 recognizes the traveling environments of the subject vehicle based on the detection result by the surroundings monitoring sensor 31. The surroundings monitoring sensor 31 is an autonomous sensor that monitors environment around the vehicle A, and includes an LiDAR (Light Detection and Ranging/Laser Imaging Detection and Ranging), which detects a point cloud of feature points of object on land, and a periphery monitoring camera, which captures images of a predetermined area including the front of the vehicle A. The surroundings monitoring sensor 31 includes a millimeter wave radar, sonar, and the like. The surroundings monitoring ECU 30 recognizes the existence and the positions of obstacles on the path of travel and other vehicles such as preceding vehicles, vehicles traveling beside the vehicle A, and oncoming vehicles by image analysis processing based on the point cloud image acquired from the LiDAR and the captured image acquired from the camera. The surroundings monitoring ECU 30 sequentially provides the recognition results to the trajectory generation device 100 as the recognized information.

The vehicle control ECU 40 is an electronic control device that performs acceleration and deceleration control and steering control of the vehicle A. The vehicle control ECU 40 includes a steering ECU that performs steering control, a power unit control ECU and a brake ECU that perform acceleration and deceleration control, and the like. The vehicle control ECU 40 acquires detection signals output from respective sensors such as the steering angle sensor, the vehicle speed sensor, and the like mounted on the vehicle A, and outputs a control signal to an electronic control throttle, a brake actuator, an EPS (Electronic Power Steering) motor, and the like. The vehicle control ECU 40 acquires the trajectory information (described later) related to the future trajectory of the vehicle A from the trajectory generation device 100 and control travel control devices to realize the autonomous driving or the driving assistance along the future trajectory.

The in-vehicle communication device 50 is a communication module mounted on the vehicle A. The in-vehicle communication device 50 has at least a V2N (Vehicle to cellular Network) communication function in line with communication standards such as LTE (Long Term Evolution) and 5G, and sends and receives radio waves to and from base stations around the vehicle A. The in-vehicle communication device 50 may further have functions such as road-to-vehicle (Vehicle to roadside Infrastructure, hereinafter "V2I") communication and inter-vehicle (Vehicle to Vehicle, hereinafter "V2V") communication. The in-vehicle communication device 50 enables cooperation between a cloud system and an in-vehicle system (Cloud to Car) by V2N communication. By mounting the in-vehicle communication device 50, the vehicle A as a connected car is able to connect to the Internet.

The display device 60 is an in-vehicle display device mounted in the vehicle A. The display device 60 is, for example, a head-up display configured to project a virtual image onto a floodlight member, a meter display provided in the meter, or a CID (Center Information Display) provided in the center of the instrument panel. The display device 60 is electrically connected with the trajectory generation device 100 to sequentially acquire display data generated by the trajectory generation device 100. The display device 60 displays contents based on the display data to present various information to the driver.

The trajectory generation device 100 is an electronic control device configured to recognize a recognition target in the outside based on the information acquired from the locator 10, the map DB 20, the surroundings monitoring ECU 30, and the like and estimate the position of the vehicle A based on the recognized results. The trajectory generation device 100 mainly includes a computer including a processor 102, a memory 101, an input/output interface, a bus connecting these components, and the like. The processor 102 is a hardware for arithmetic processing. The processor 102 includes, as a core, at least one type of, for example, a CPU (Central Processing Unit), a GPU (Graphics Processing Unit), an RISC (Reduced Instruction Set Computer) CPU, and so on.

The memory 101 is at least one type of non-transitory tangible storage medium, such as a semiconductor memory, a magnetic storage medium, and an optical storage medium, for non-transitory storing or memorizing computer readable programs and data. The memory 101 stores various programs executed by the processor 102, such as a trajectory generation program described later with reference to FIG. 4.

The processor 102 executes a plurality of instructions included in the outside recognition program stored in the memory 101. Thereby, the trajectory generation device 100 establishes a plurality of functional blocks for generating the future trajectory. As described above, in the trajectory generation device 100, multiple functional blocks are built by causing the processor 102 to execute multiple instructions by the program stored in the memory 101 for driving support. Specifically, the trajectory generation device 100 builds functional blocks including an action plan unit 110, a trajectory plan unit 120, a display information generation unit 130, and a spot information generation unit 140.

The action plan unit 110 plans future action planned for the vehicle A and propose (provide) it to the trajectory plan unit 120. The future action is a type of behavior of the vehicle A that can be realized by traveling control on the traveling route, and defines a range in which the trajectory candidates can be taken, which will be described later. The future action includes a priority action to be executed preferentially, and an alternative action to be executed as an alternative when the priority action cannot be executed. When there are multiple alternative actions, the priority action and the alternative action are set in advance for each pattern of traveling scenes and stored in a storage medium such as the memory 101. When there are multiple alternative actions for one situation, the priority among the alternative actions is also set.

Specifically, for a going-straight scene in which the vehicle A is to go straight in the current lane, a going-straight action that continues to go straight in the current lane, and an avoidance action for avoiding an obstacle by existing the current lane into the adjacent lane and returning back to the current lane are set as the future action. In this case, the going-straight action is set as the priority action, and the avoidance action is set as the alternative action.

As a further specific example, for a right-turn scene where a right-turn is made at an intersection, a right-turn action to enter a specific lane after the right turn and a waiting action at the right turn waiting position are set as the future actions. When there are multiple lanes after making the right-turn, the right-turn action into the optimum lane is set as the priority action from the viewpoint of arrival at the destination, and the right-turn action into another lane and the waiting action are set as the alternative actions. In the right-turn action which is the alternative action and wait actions, the right-turn action is the higher-priority future action.

In addition, the action plan unit 110 plans a necessary condition for executing the above future actions. The necessary condition relates to at least one of the traveling position or the traveling time of the vehicle A in the future action. The necessary condition is a condition for determining whether the future action can be executed and imposed on the trajectory candidates described later. When at least one of the trajectory candidates satisfies the necessary condition, the future action is determined as feasible.

For example, the action plan unit 110 sets a target point P in the planned travelling section and sets, as the necessary condition, the arrival target time to reach the target point P. In this case, the action plan unit 110 sets the arrival target time based on the traffic regulations and the traffic morals. Traffic moral is a norm to control the impact of the behavior of the vehicle A on other vehicles and pedestrians, such as completing the passage through an intersection within a predetermined time, keeping the time to overflow into the oncoming lane within a predetermined time, and the like. The action plan unit 110 provides the planned future actions and the necessary conditions to the trajectory plan unit 120.

The action plan unit 110 starts planning the future action and the necessary condition based on the recognized information, the location information, and the map information. The action plan unit 110 acquires, from a trajectory evaluation unit 122 described later, information about whether the proposed future action can be executed. That is, the action plan unit 110 acquires information (evaluation results) about whether the proposed future action is adopted or rejected. When the future action is adopted, the action plan unit 110 sets the state of the vehicle A as the execution state of the future action. When the future action is rejected, the action plan unit 110 proposes the future action again. The action plan unit 110 repeatedly plans and proposes until any one future action is adopted. The action plan unit 110 plans and proposes to stop the vehicle A when all future actions that can continue driving are evaluated by the trajectory evaluation unit 122 to be infeasible.

The trajectory plan unit 120 plans the future trajectory in accordance with the future action. The future trajectory is a trajectory that the vehicle A will follow to realize the future action, and defines the position and the speed of the vehicle A at each time point. The trajectory plan unit 120 has, as sub-blocks, a trajectory candidate generation unit 121, a trajectory evaluation unit 122, and a trajectory adjusting unit 123.

The trajectory candidate generation unit 121 generates the trajectory candidates of the future trajectory in accordance with the future action proposed by the action plan unit 110. The trajectory candidate generation unit 121 generates multiple trajectory candidates in accordance with the future action. The trajectory candidate generation unit 121 sets a range in which the trajectory is generated in accordance with the future action and generate the trajectory candidates within the range.

For example, when the going-straight action is proposed, the trajectory candidate generation unit 121 sets the current lane as the range for generating the trajectory. When the avoidance action is proposed, the trajectory candidate generation unit 121 sets the current lane and the adjacent lane as the range for generating the trajectory. The trajectory candidate generation unit 121 generates multiple trajectory candidates in the current lane, which are offset in the width direction of the lane from each other. The trajectory candidate generation unit 121 generates trajectory candidates on a rule basis based on the location information and map information. The trajectory candidate generation unit 121 provides the information of the generated trajectory candidates to the trajectory evaluation unit 122.

The trajectory evaluation unit 122 evaluates each trajectory candidate to determine whether the traveling along the trajectory candidate is permissible. When the traveling along at least one of the trajectory candidates for one future action is permissible, the future action can be executed. When the traveling along any one of the trajectory candidates is not permissible, the future action cannot be executed.

Specifically, the trajectory evaluation unit 122 determines whether the trajectory candidates includes a trajectory that satisfies the necessary condition and along which the vehicle A can travel without colliding with other objects such as obstacles and other vehicles. When the trajectory evaluation unit 122 determines that the trajectory candidates includes a trajectory that satisfies the necessary condition and along which the vehicle A can travel without colliding with other objects, the trajectory evaluation unit 122 determines that the future action can be executed, and the trajectory evaluation unit 122 determines to adopt the proposed future action. In contrast, when the trajectory evaluation unit 122 determines that the trajectory candidates includes no trajectory that satisfies the necessary condition and along which the vehicle A can travel without colliding with other objects, the trajectory evaluation unit 122 determines that the future action cannot be executed, and the trajectory evaluation unit 122 rejects the proposed future action.

When only one trajectory candidate is evaluated to be permissible, the trajectory evaluation unit 122 sets this trajectory candidate as a provisional future trajectory, and the trajectory evaluation unit 122 provides the information about the provisional future trajectory to the trajectory adjusting unit 123. In contrast, when multiple trajectory candidates are evaluated to be permissible, the trajectory evaluation unit 122 selects one provisional future trajectory from the permissible trajectory candidates. For example, the trajectory evaluation unit 122 determines whether the permissible trajectory candidates include a trajectory (margin trajectory) in which closest distance between the vehicle A and the other object is at or above a preset margin. When the trajectory candidates include the margin trajectories, the trajectory evaluation unit 122 selects, as the provisional future trajectory, one which is the closest to the center part of the range of the trajectory (see the left side of FIG. 3). For example, the range is the current lane, the trajectory evaluation unit 122 selects, as the provisional future trajectory, the trajectory which is the closest to the center part of the current lane. In the left frame of FIG. 3, only the first one from the right is the margin trajectory and the provisional future trajectory. In contrast, when it is determined that the trajectory candidates include no margin trajectory as shown in the right frame of FIG. 3, the trajectory evaluation unit 122 sets, as the provisional future trajectory, the trajectory in which the closest distance between the vehicle A and the other object is the largest in the trajectory candidates which is evaluated as permissible (see the solid line in the right frame of FIG. 3).

Further, the trajectory evaluation unit 122 sets a limitation area for the correction of the provisional future trajectory executed by the trajectory adjusting unit 123. Specifically, the trajectory evaluation unit 122 sets the area for the provisional future trajectory where the shape change o the trajectory due to the correction fits. The area may be set based on the margin between the vehicle A and the object, the position and the shape of the trajectory candidates which are not selected as the provisional future trajectory, and the like. The trajectory evaluation unit 122 outputs the provisional future trajectory and the information about the limitation area to the trajectory adjusting unit 123.

When the provisional future trajectory is evaluated to be permissible, the trajectory adjusting unit 123 fixes the provisional future trajectory as the future trajectory. The trajectory adjusting unit 123 corrects the provisional future trajectory based on the conditions about the behavior of the vehicle A. The trajectory adjusting unit 123 fixes the future trajectory by optimizing the provisional future trajectory to improve the ride quality of the vehicle A. For example, the trajectory adjusting unit 123 optimizes the future trajectory such that the jerk of the vehicle A is minimized. The trajectory adjusting unit 123 performs constrained optimization of the provisional future trajectory, with the constraint that the trajectory falls within the limitation area set by the trajectory evaluation unit 122. The trajectory adjusting unit 123 outputs the fixed future trajectory to the vehicle control ECU 40. The trajectory adjusting unit 123 is an example of a "trajectory fixing unit".

The display information generation unit 130 acquires the proposed future action and information about the rejection or adoption of the future action from the trajectory evaluation unit 122. The display information generation unit 130 generates, based on the acquired information, display information to be displayed on the display device 60 and related to the determination of the future action. When it is determined that the alternative action is executed, the display information generation unit 130 generates display information indicating (i) the future action which are originally desired to be taken, that is, the priority action, and (ii) the reason why the future action cannot be taken (reason of rejection). The display information generation unit 130 outputs the generated display information to the display device 60.

The display information generation unit 130 may transmit the generated information to a center through the in-vehicle communication device 50. In this case, the display information is displayed on a display monitor in the center. According to this, the future action which is originally desired to be taken and the reason of the rejection of the future action are presented to the operator or the like of the center.

When the priority action is rejected, the spot information generation unit 140 acquires, from the trajectory evaluation unit 122, information about the spot where the priority action is rejected. When the priority action is rejected a predetermined number of times at the substantially same spot, the spot information generation unit 140 generates information about this spot as spot information. The spot information generation 140 outputs the generated spot information to the in-vehicle communication device 50. The output spot information is transmitted to the center, for example. The spot information is used in the center as information indicating a spot where it is difficult or impossible to travel. According to this, the vehicle A and other automated vehicles can avoid traveling at the spot. The spot information generation unit 140 may transmit the spot information to other vehicles by V2V communication, and output the spot information to other ECUs mounted in the vehicle A.

Figure 3:
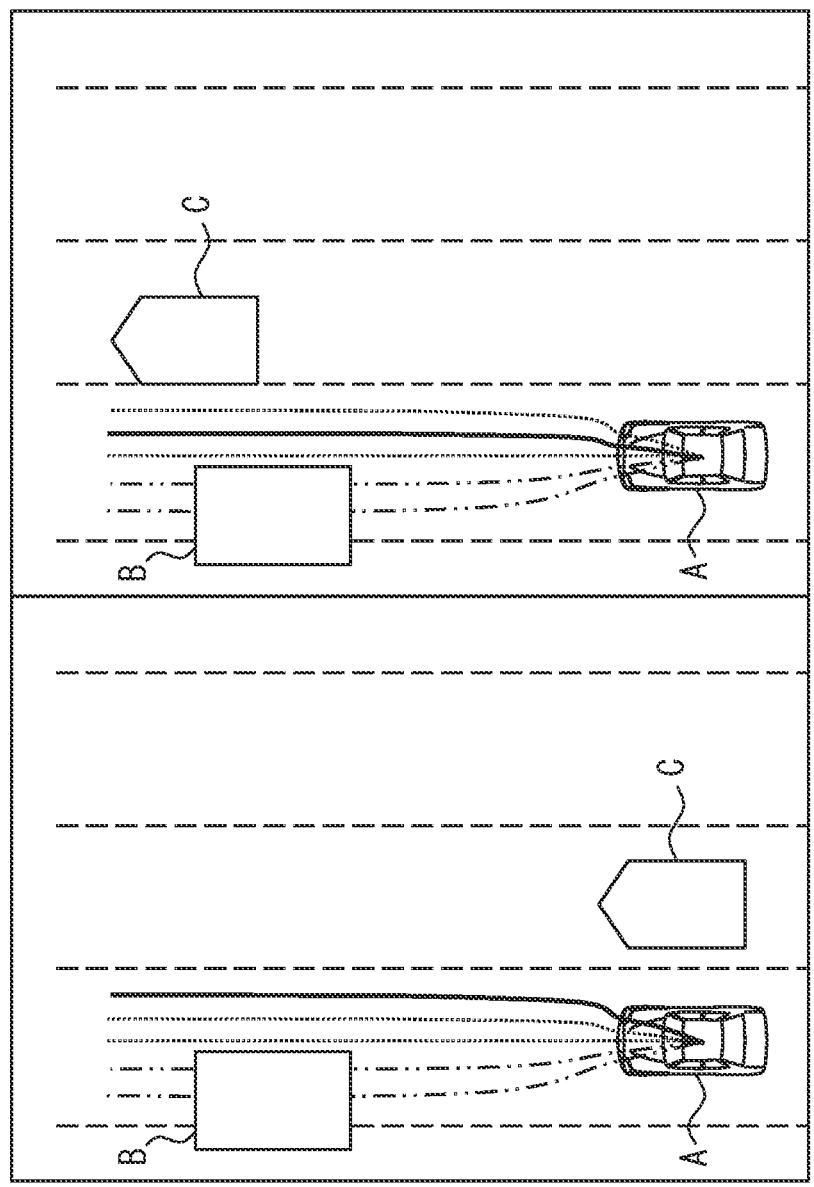
FIG. 3 is a diagram for explaining a method of selecting a provisional future trajectory from trajectory candidates.

Next, the flow of the trajectory generation method executed by cooperation of the functional blocks of the trajectory generation device 100 will be described with reference to FIGS. 3, 4. In a flowchart to be described later, "S" means multiple steps of the flowchart to be executed by multiple instructions included in the program.

Figure 4:
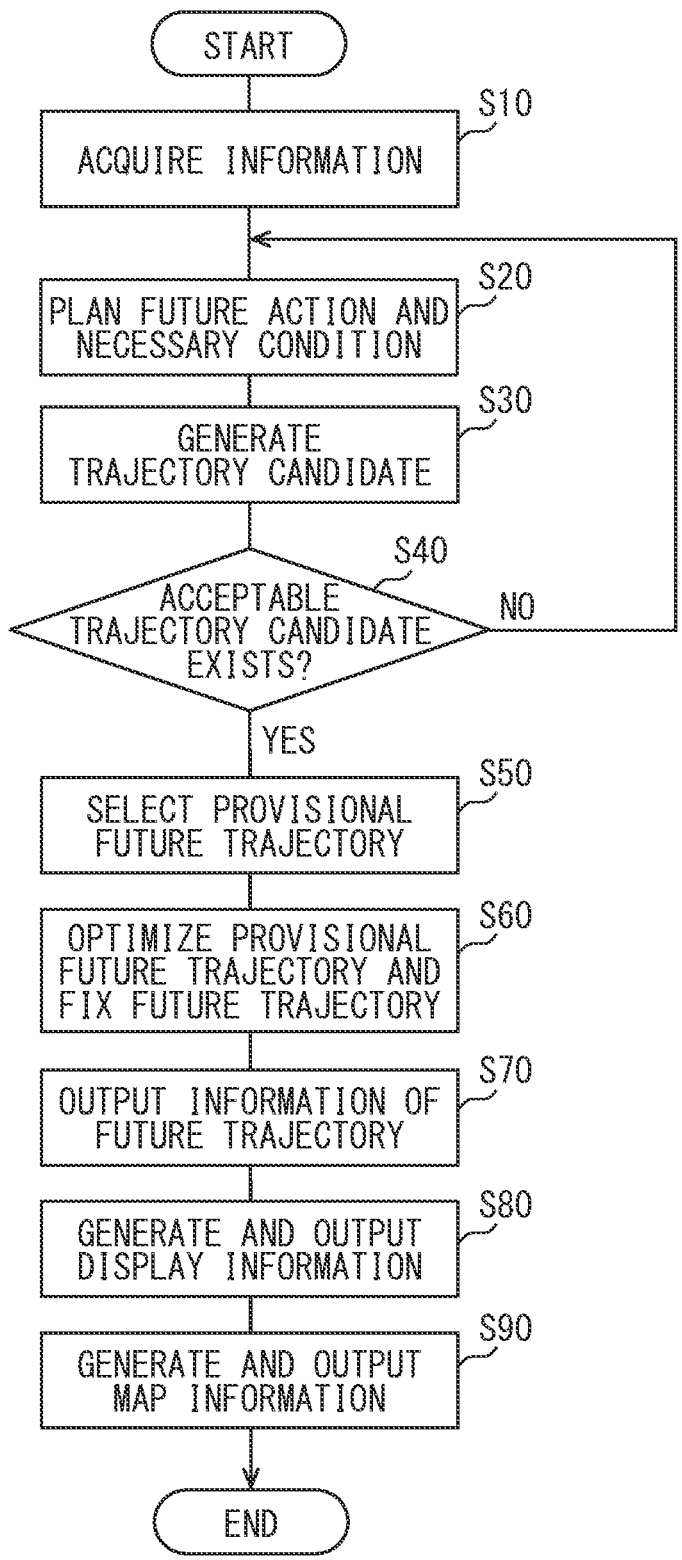
FIG. 4 is a flowchart showing an example of a trajectory generating method performed by the trajectory generation device.

In S10 of FIG. 4, the action plan unit 110 acquires information including the recognized information, the map information, the location information, and the like. In S20, the action plan unit 110 plans and proposes the future action and the necessary condition. In S30, the trajectory candidate generation unit 121 generates trajectory candidates according to the proposed future action. In S40, the trajectory evaluation unit 122 determines whether the trajectory candidates include a trajectory that can realize the future action.

When it is determined that the trajectory candidates include a trajectory that can realize the future action, the flow proceeds to S50, and the trajectory evaluation unit selects the provisional future trajectory from the trajectory candidates that can realize the future action. In S60, the trajectory adjusting unit 123 corrects the provisional future trajectory by the constrained optimization to fix the future trajectory. In S70, the trajectory adjusting unit 123 outputs, to the vehicle control ECU 40, the information about the fixed future trajectory. In S80, the display information generation unit 130 generates the display information and outputs it to the display device 60. In S90, the spot information generation unit 140 generates the spot information. When there is no spot information, S90 may be omitted. After performing the above processing, the series of processing is terminated.

In contrast, when it is determined that the trajectory candidates include no trajectory that can realize the future action, the flow returns to S20. When the proposed future action cannot be realized, new future action is proposed by the loop processing of S20 to S40. The re-proposal of the future action is repeated until the future action having a feasible trajectory candidate is proposed by the loop processing. When all future actions that can continue the traveling are rejected, the stop of the vehicle A is planned in S20.

S20 is an example of an "action plan process", S30 is an example of a "trajectory candidates generation process", S40-S50 are an example of a "trajectory evaluation process", and S60 is an example of a "trajectory fixation process".

Next, an example of the control state transitions of the action plan unit 110 and the trajectory plan unit 120 in a specific driving scene is described with reference to FIGS. 5-8.

Figure 5:
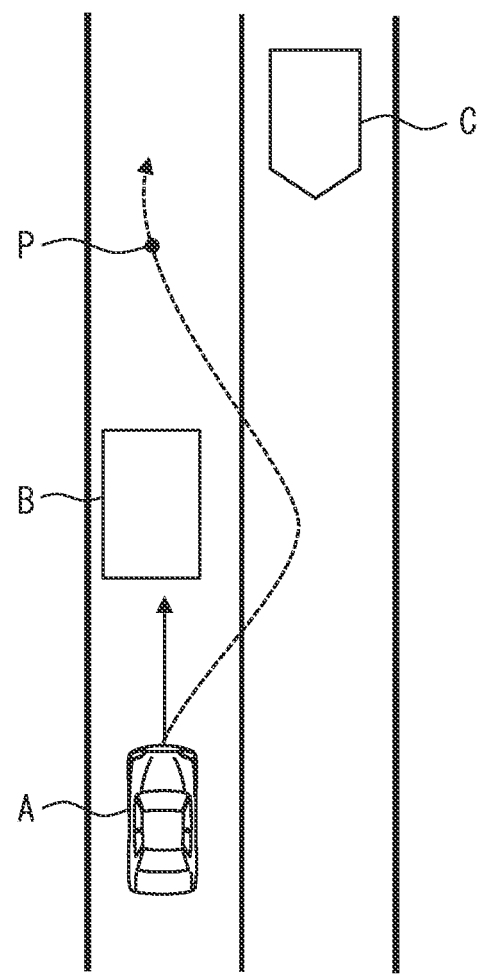
FIG. 5 is a diagram showing an example of a traveling scene.

FIG. 5 shows a going-straight scene. Specifically, the vehicle A is traveling on a two-lane road with one lane on each side. An obstacle B exists on the lane in which vehicle A is currently traveling (current lane). The obstacle B here is assumed to be, for example, a roadside drop or a parked vehicle, which exists at a position that makes it impossible for the vehicle A to pass through while maintaining its travel in the current lane. In addition, an oncoming vehicle as another vehicle C is traveling in the oncoming lane adjacent to the current lane.

Figure 6:
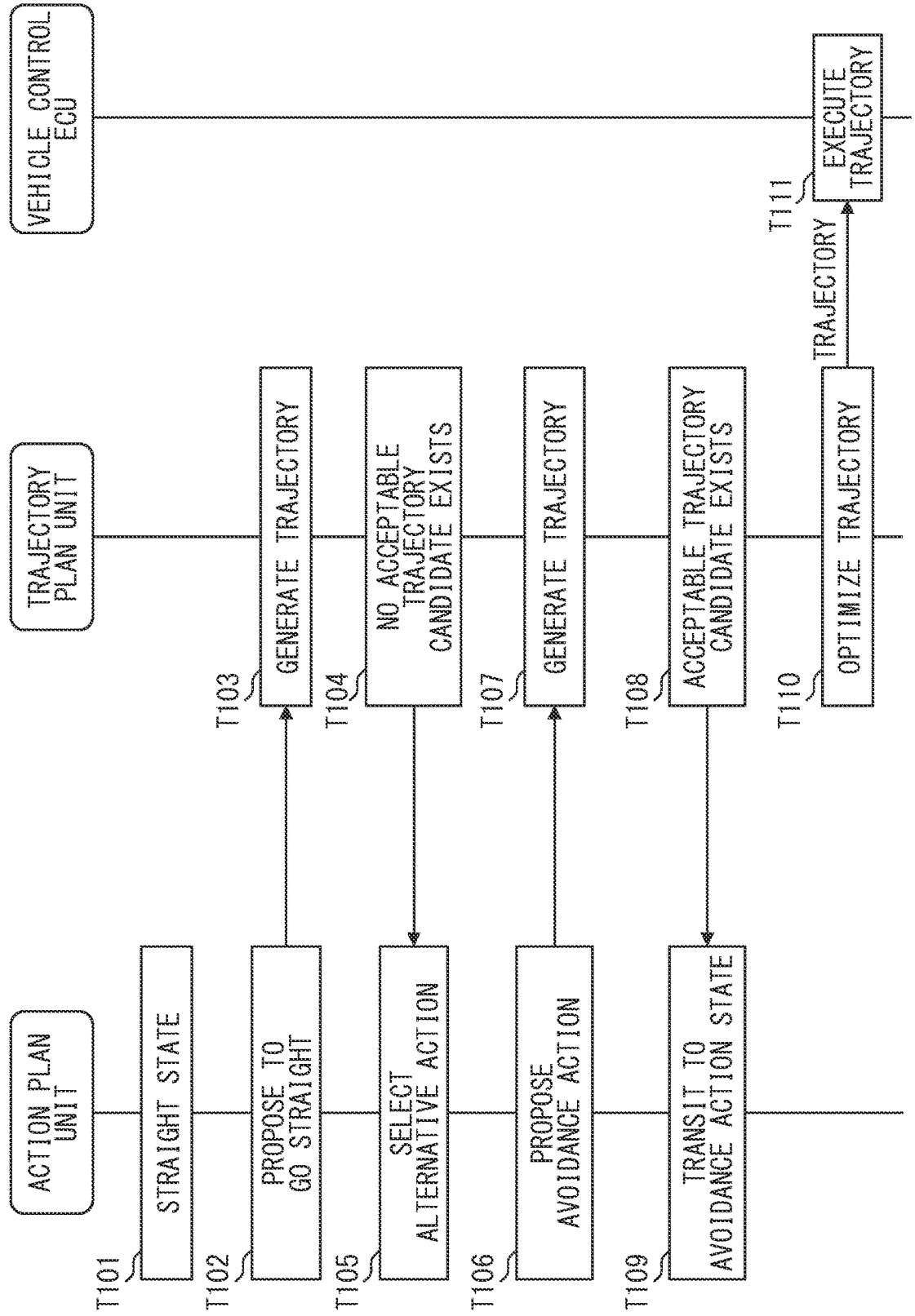
FIG. 6 is a sequence diagram showing a processing state of the trajectory generation device in the traveling scene shown in FIG. 5.

FIG. 6 is a sequence diagram illustrating transitions of the processing state in the going-straight scene shown in FIG. 5. In T101, the state of the vehicle A is recognized by the action plan unit 110 as the going-straight state. In T102, the action plan unit 110 transitions the state to propose the future action in response to the detection of the obstacle B. In this scene, the state transitions to propose the going-straight action (see solid line in FIG. 5) which is the future action with the highest priority. Then the action plan unit 110 provides the future actions and the necessary conditions to the trajectory plan unit 120. The necessary condition here is to reach the target point P within the arrival target time.

In T103, the trajectory plan unit 120 transitions the state to generate going-straight trajectories. In T104, since the trajectory candidates of the going-straight trajectory includes no feasible trajectory, the state transitions to no feasible trajectory state. Then the trajectory plan unit 120 provides the information about the rejection of the going-straight action to the action plan unit 110. In T105, the action plan unit 110 which received the information about the rejection of the going-straight action transitions the state to select the alternative action. In T106, the action plan unit 110 transitions the state to propose the avoidance action (see the dashed line arrow in FIG. 5) which is the future action having the next highest priority after the going-straight action. Then the action plan unit 110 provides the alternative action and the necessary conditions to the trajectory plan unit 120 again. The necessary condition here is to reach the target point P within the arrival target time.

In T107, the trajectory plan unit 120 transitions the state to generate the trajectory for the avoidance action. In T108, it is determined that the trajectory candidates include a feasible trajectory, and the state transitions to a state where an acceptable trajectory exists. Then the trajectory plan unit 120 provides, to the action plan unit 110, information indicating that the avoidance action is adopted. In T109, the action plan unit 110 received the information indicating the adoption of the action transitions the state to an avoidance action state. The trajectory plan unit 120 which transitioned to the state where the acceptable trajectory exists in T108 transitions the state to optimize the trajectory in T110. Then the trajectory plan unit 120 optimizes the trajectory to fix the trajectory, and provides the fixed trajectory to the vehicle control ECU 40. The vehicle control ECU 40 receiving the fixed trajectory transitions the state to execute the avoidance trajectory.

Figure 7:
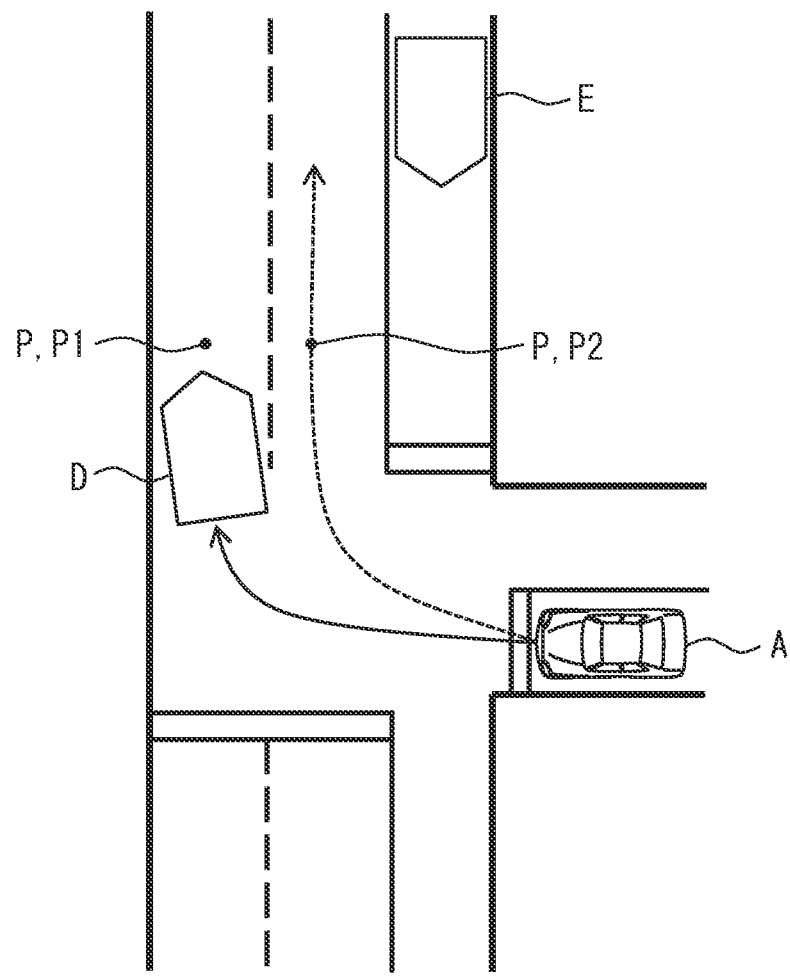
FIG. 7 is a diagram showing an example of a traveling scene.

FIG. 7 shows a turning-right scene at an intersection. To elaborate on this scene, the vehicle A is stopped in the approach lane in the intersection where the two exit lanes are connected and is going to make a right turn. Further, the preceding vehicle as the other vehicle D is entering the left lane toward the direction of travel (hereinafter referred to as the left lane) of the two exit lanes. In addition, an oncoming vehicle as the other vehicle E is traveling in the oncoming lane adjacent to the exit lane.

Figure 8:
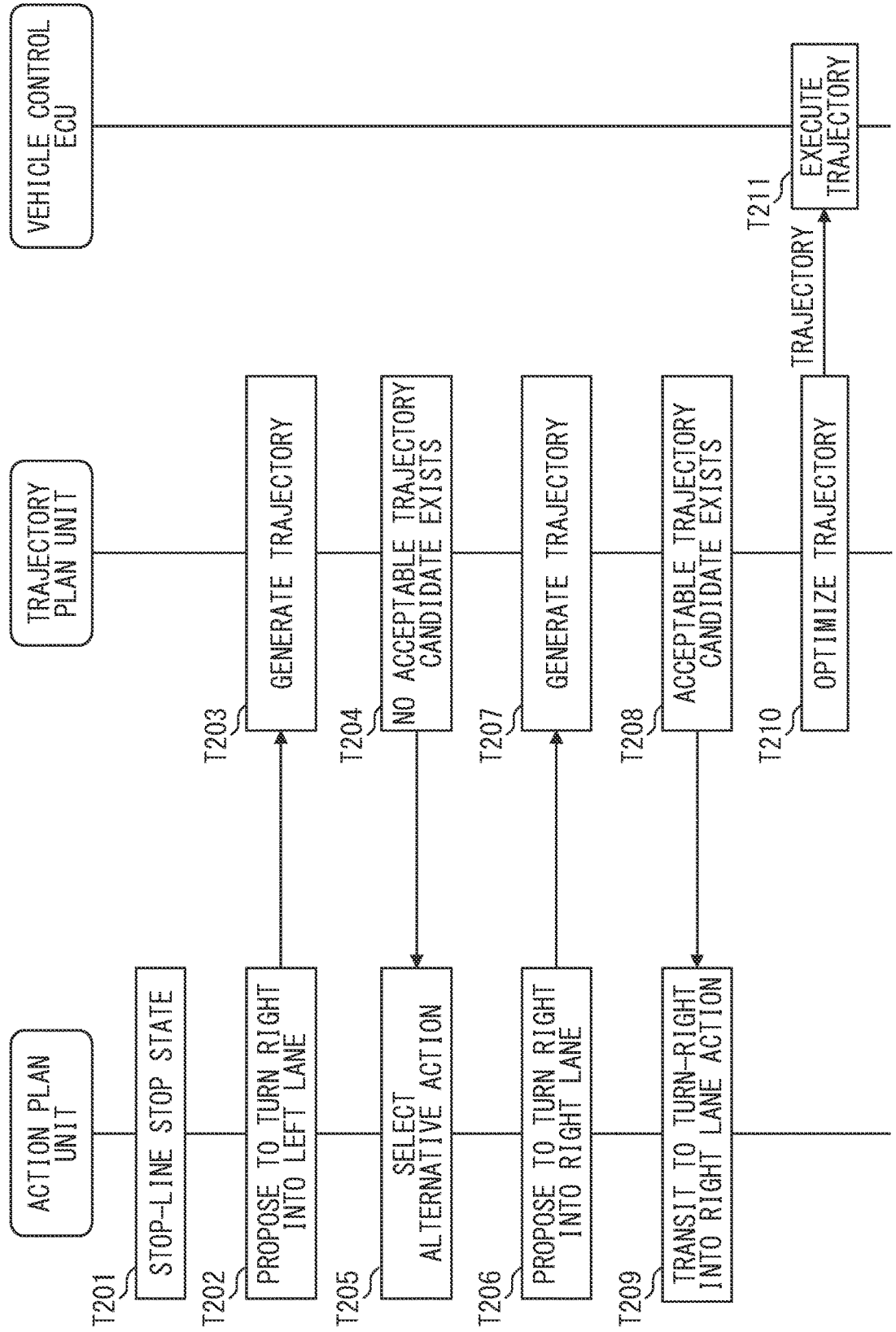
FIG. 8 is a sequence diagram showing a processing state of the trajectory generation device in the traveling scene shown in FIG. 7.

FIG. 8 is a sequence diagram illustrating transitions of the processing state in the turning-right scene shown in FIG. 7. In T201, the state of the vehicle A is recognized by the action plan unit 110 as the stop-line stop state. In T202, the action plan unit 110 transitions the state to propose the future action. In this scene, the state transitions to propose the turning-right action into the left lane (see solid line in FIG. 7) which is the future action with the highest priority. Then the action plan unit 110 provides the future actions and the necessary conditions to the trajectory plan unit 120. The necessary condition here is to reach a first target point P1, which is the target point P set on the left lane, within the arrival target time.

In T203, the trajectory plan unit 120 transitions the state to generate trajectories for turning right into the left lane. In T204, since the trajectory candidates for turning-right into the left lane includes no feasible trajectory, the state transitions to no feasible trajectory state. Then the trajectory plan unit 120 provides the information about the rejection of the turning-right into the left lane action to the action plan unit 110. In T205, the action plan unit 110 which received the information about the rejection of the turning-right into the left lane action transitions the state to select the alternative action. In T206, the action plan unit 110 transitions the state to propose the turning-right into the right lane action (see the dashed line arrow in FIG. 7) which is the future action having the next highest priority after the turning-right into the left lane action. Then the action plan unit 110 provides the alternative action and the necessary conditions to the trajectory plan unit 120 again. The necessary condition here is to reach a second target point P2, which is the target point P set on the right lane, within the arrival target time.

In T207, the trajectory plan unit 120 transitions the state to generate the trajectory for turning right into the right lane. In T208, it is determined that the trajectory candidates include a feasible trajectory, and the state transitions to a state where an acceptable trajectory exists. Then the trajectory plan unit 120 provides, to the action plan unit 110, information indicating that the turning-right into the right lane action is adopted. In T209, the action plan unit 110 received the information indicating the adoption of the action transitions the state to an turning-right into the right lane state. The trajectory plan unit 120 which transitioned to the state where the acceptable trajectory exists in T208 transitions the state to optimize the trajectory in T210. Then the trajectory plan unit 120 optimizes the trajectory to fix the trajectory, and provides the fixed trajectory to the vehicle control ECU 40. The vehicle control ECU 40 receiving the fixed trajectory transitions the state to execute the trajectory to turn right into the right lane.

The description below explains operations and effects provided by the first embodiment.

According to the first embodiment, when the future action is evaluated as unacceptable based on the trajectory candidates generated in accordance with the future action, another future action is proposed. Accordingly, even when one future action is not feasible, the vehicle A can be driven based on the other future action when the other future action is feasible. Accordingly, the vehicle A can be continuously driven.

According to the first embodiment, the necessary condition including the target arrival time to the target point P, which is a specific point on the planned traveling area, is proposed, and the trajectory candidates are evaluated based on the necessary condition. According to this, even when the vehicle A can arrive at the target point P, the future action is rejected if it takes time more than the target arrival time for the vehicle A to arrive at the target point P. Thus, it is possible to avoid negatively impacting the traffic situation around the vehicle A by executing future actions that take an excessive time.

Further, according to the first embodiment, the trajectory candidate corrected based on the condition about the behavior of the vehicle A is fixed as the future trajectory. According to this, the future trajectory can be generated in consideration of the behavior of the vehicle A.

Further, according to the first embodiment, multiple trajectory candidates are generated, the provisional future trajectory that realizes the future action is selected from trajectory candidates, and the future trajectory is fixed by correcting the selected provisional future trajectory within the constraint. According to this, the provisional future trajectory is corrected after the provisional future trajectory is selected from the trajectory candidates. Accordingly, the provisional future trajectory to be corrected is picked up from multiple trajectory candidates. Thus, the number of trajectory candidates for which corrections are performed can be reduced and the computational load can be reduced.

Further, according to the first embodiment, it is proposed to stop the vehicle A when all future actions that can continue driving are evaluated to be infeasible. Accordingly, it is possible to reliably evaluate whether the future action that can continue driving is feasible, and the vehicle A can be stopped when all future actions are substantially infeasible.

Second Embodiment

In a second embodiment, a modification of the trajectory generation device 100 according to the first embodiment will be described. In the second embodiment, the action plan unit 110 is configured to count the number of patterns of the future action proposed for one traveling scene. The action plan unit 110 proposes an MRM (Minimum Risk Maneuver) action when the number of patterns reaches an acceptable number even if there is an alternative action. MRM is a driving control that stops the vehicle A in a traveling lane or near a road shoulder by automatic driving. The trajectory plan unit 120 generates an MRM trajectory for the MRM action as in the normal future action when the MRM action is proposed.

Figure 9:
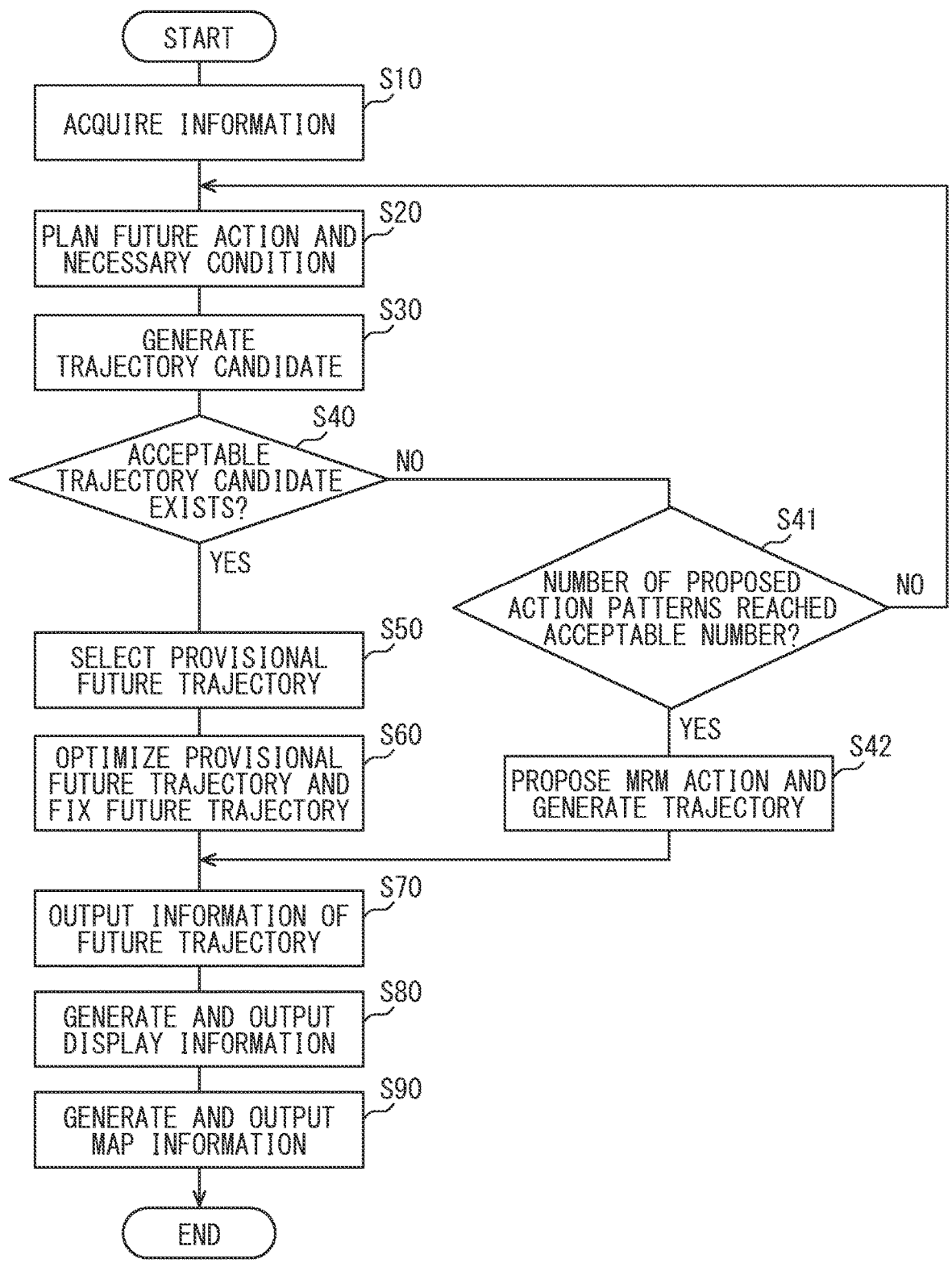
FIG. 9 is a flowchart showing an example of a trajectory generating method performed by a trajectory generation device according to a second embodiment.

The flow of the trajectory generation method performed by the trajectory generation device 100 according to the second embodiment will be described with reference to FIG. 9. For the flow in FIG. 9, those with the same reference numerals as those in FIG. 4 are processed in the same way, so the explanation for FIG. 4 is applied.

when it is determined that the trajectory candidates include no trajectory that can realize the proposed future action, the flow proceeds to S41. In S41, the action plan unit 110 determines whether the number of patterns of the proposed future action reached the acceptable number. When the number has not reached the acceptable number, the flow returns to S20 to propose alternative action.

When it is determined in S41 that the number of patterns of the proposed future action reached the acceptable number, the flow proceeds to S42. In S42, the action plan unit 110 proposes the MRM action, and then the trajectory plan unit 120 generates the MRM trajectory and fix the trajectory. After that, the MRM is executed by outputting the information of the MRM trajectory in S70, and then the processing is completed.

According to the second embodiment, when it is determined that the number of patterns of the future action which are evaluated as infeasible reached the acceptable number, the MRM action is proposed to stop the vehicle A as emergency avoidance. According to this, since the number of the proposals of the future action is limited, the computation time until the final future trajectory is output can be suppressed.

OTHER EMBODIMENTS

The disclosure in the present specification is not limited to the illustrated embodiments. The disclosure encompasses the illustrated embodiments and variations based on the embodiments by those skilled in the art. For example, the present disclosure is not limited to the combinations of components and/or elements shown in the embodiments. The present disclosure may be implemented in various combinations. The present disclosure may have additional members which may be added to the embodiments. The present disclosure encompasses the embodiments where some components and/or elements are omitted. The present disclosure encompasses replacement or combination of components and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

In the above-described embodiment, the trajectory adjusting unit 123 is configured to correct the provisional future trajectory which is selected from the trajectory candidates. Instead of this, the trajectory adjusting unit 123 may correct the trajectory candidates.

In the above-described embodiments, the action plan unit 110 is configured to set the necessary condition including the arrival at the target point P within the arrival target time. Instead of this, the action plan unit 110 may set the arrival at the target point P without stopping as the necessary condition. For example, the action plan unit 110 may set the necessary condition when the time for which the future trajectory can be generated is shorter than the target arrival time.

In the above-described embodiments, the trajectory generation device 100 causes the vehicle control ECU 40 to execute the traveling control based on the generated future trajectory. The trajectory generation device 100 may cause the in-vehicle device to execute other vehicle controls associated with driving based on the future trajectory. For example, when a future action that requires lighting of a turn signal such as turning right or right and changing lanes is executed, the trajectory generation device 100 outputs a lighting instruction to the turn signal after the trajectory evaluation unit 122 evaluated the future action as permitted. That is, when the future action is planned but the traveling along the corresponding trajectory candidates is not permitted, the output of the lighting instruction is prohibited. Further, in the vehicle A equipped with an external display device configured to perform a display for a person outside the vehicle such as a pedestrian, the trajectory generation device 100 may be configured to output a display instruction after the future action requiring the display for a person outside the vehicle is evaluated as permitted.

The trajectory generation device 100 may be a special purpose computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

The trajectory generation device 100 may be a set of computer resources linked by a computer or data communication device. For example, some of the functions provided by the trajectory generation device 100 in the above-described embodiment may be realized by another ECU. Specifically, the action plan unit 110 and the trajectory plan unit 120 may be realized by different ECUs. Further, a part of the functions provided by the trajectory generation device 100 may be realized by the center.

The description in the above embodiments is adapted to the region where left-hand traffic is designated by law. In the region where right-hand traffic is designated by law, left and right are reversed.

What is claimed is:

1. A trajectory generation device configured to generate a future trajectory along which a vehicle travels in a future, the trajectory generation device comprising:
    an action plan unit configured to plan a future action of the vehicle;
    a trajectory candidate generation unit configured to generate a trajectory candidate of the future trajectory in accordance with the planned future action;
    a trajectory evaluation unit configured to evaluate whether a traveling along the trajectory candidate is permitted; and
    a trajectory fixing unit configured to fix the trajectory candidate as the future trajectory when it is determined that the traveling along the trajectory candidate is permitted, wherein
    the action plan unit is configured to plan the future action again when it is determined that the traveling along the trajectory candidate is not permitted,
    the action plan unit is configured to plan a necessary condition related to at least one of a traveling position and a traveling time of the vehicle due to the future action,
    the trajectory evaluation unit is configured to evaluate the trajectory candidate based on the necessary condition, and
    the necessary condition includes a target arrival time for arriving at a specific point on a planned traveling section where the vehicle travels in accordance with the future action, and
    wherein
    the vehicle is controlled to execute a vehicle traveling control based on the generated future trajectory,
    the target arrival time is set in advance based on a traffic regulation and a traffic moral as a time required for arriving at the specific point on the planned traveling section where the vehicle travels in accordance with the future action, and
    the trajectory evaluation unit rejects the future action for a state in which the time required for arriving at the specific point is greater than the target arrival time.

2. The trajectory generation device according to claim 1, wherein
    the trajectory fixing unit is configured to
        correct, based on a condition related to a behavior of the vehicle, a shape of the trajectory candidate that is evaluated that the traveling along the trajectory candidate is permitted, and
        fix the corrected trajectory candidate as the future trajectory.

3. The trajectory generation device according to claim 2, wherein
    the trajectory candidate generation unit is configured to generate a plurality of the trajectory candidates,
    the trajectory evaluation unit is configured to select a provisional future trajectory from the plurality of trajectory candidates, the traveling along the provisional future trajectory being evaluated to be permitted, and
    the trajectory fixing unit is configured to
        correct a shape of the selected provisional future trajectory within a constraint, and
        fix the corrected provisional future trajectory as the future trajectory.

4. The trajectory generation device according to claim 1, wherein
    the action plan unit is configured to plan to stop the vehicle when the traveling along the trajectory candidate is not permitted for all of the future actions which allow the vehicle to continue traveling.

5. The trajectory generation device according to claim 1, wherein
    the action plan unit is configured to plan to stop the vehicle when a number of patterns of the future action whose trajectory candidate is evaluated that the traveling along the trajectory candidate is not permitted reaches an upper limit number.

6. A method for a processor to generate a future trajectory along which a vehicle travels in a future, the method comprising:
    planning a future action of the vehicle;
    generating a trajectory candidate of the future trajectory in accordance with the planned future action;
    evaluating whether a traveling along the trajectory candidate is permitted;
    fixing the trajectory candidate as the future trajectory when it is determined that the traveling along the trajectory candidate is permitted; and
    planning the future action again when it is determined that the traveling along the trajectory candidate is not permitted,
    wherein
    in the planning the future action, a necessary condition related to at least one of a traveling position and a traveling time of the vehicle for the future action is planned, the necessary condition includes a target arrival time for arriving at a specific point on a planned traveling section where the vehicle travels in accordance with the future action, and
    in the evaluating, the trajectory candidate is evaluated based on the necessary condition, and
    wherein
    the vehicle is controlled to execute a vehicle traveling control based on the generated future trajectory,
    the target arrival time is set in advance based on a traffic regulation and a traffic moral as a time required for arriving at the specific point on the planned traveling section where the vehicle travels in accordance with the future action, and
    the future action is rejected for a state in which the time required for arriving at the specific point is greater than the target arrival time.

7. The method according to claim 6, wherein
    in the fixing, a shape of the trajectory candidate that is evaluated that the traveling along the trajectory candidate is permitted is corrected based on a condition related to a behavior of the vehicle, and the corrected trajectory candidate is fixed as the future trajectory.

8. The method according to claim 7, wherein
in the generating the trajectory candidate, a plurality of the trajectory candidates are generated,
in the evaluating, a provisional future trajectory is selected from the plurality of trajectory candidates, the traveling along the provisional future trajectory being evaluated to be permitted, and
in the fixing, a shape of the selected provisional future trajectory is corrected within a constraint, and the corrected provisional future trajectory is fixed as the future trajectory.

9. The method according to claim 6, wherein
in the planning the future action, a stop of the vehicle is planned when the traveling along the trajectory candidate is not permitted for all of the future actions which allow the vehicle to continue traveling.

10. The method according to claim 6, wherein
in the planning the future action, a stop of the vehicle is planned when a number of patterns of the future action whose trajectory candidate is evaluated that the traveling along the trajectory candidate is not permitted reaches an upper limit number.

11. A computer program product for generating a future trajectory along which a vehicle travels in a future, the computer program product stored on at least one non-transitory computer readable medium and comprising instructions configured to, when executed by at least one processor, to cause the at least one processor to:
plan a future action of the vehicle;
generate a trajectory candidate of the future trajectory in accordance with the planned future action;
evaluate whether a traveling along the trajectory candidate is permitted;
fix the trajectory candidate as the future trajectory when it is determined that the traveling along the trajectory candidate is permitted; and
plan the future action again when it is determined that the traveling along the trajectory candidate is not permitted,
wherein the instructions are configured to, when executed by the at least one processor, further cause the at least one processor to:
plan a necessary condition related to at least one of a traveling position and a traveling time of the vehicle for the future action, the necessary condition includes a target arrival time for arriving at a specific point on a planned traveling section where the vehicle travels in accordance with the future action; and
evaluate the trajectory candidate based on the necessary condition, and
wherein
the vehicle is controlled to execute a vehicle traveling control based on the generated future trajectory,
the target arrival time is set in advance based on a traffic regulation and a traffic moral as a time required for arriving at the specific point on the planned traveling section where the vehicle travels in accordance with the future action, and
the future action is rejected for a state in which the time required for arriving at the specific point is greater than the target arrival time.

12. The computer program product according to claim 11, wherein the instructions are configured to, when executed by the at least one processor, further cause the at least one processor to:
correct, based on a condition related to a behavior of the vehicle, a shape of the trajectory candidate that is evaluated that the traveling along the trajectory candidate is permitted; and
fix the corrected trajectory candidate as the future trajectory.

13. The computer program product according to claim 12, wherein the instructions are configured to, when executed by the at least one processor, further cause the at least one processor to:
generate a plurality of the trajectory candidates;
select a provisional future trajectory from the plurality of trajectory candidates, the traveling along the provisional future trajectory being evaluated to be permitted; and
correct a shape of the selected provisional future trajectory within a constraint; and
fix the corrected provisional future trajectory as the future trajectory.

14. The computer program product according to claim 11, wherein the instructions are configured to, when executed by the at least one processor, further cause the at least one processor to:
plan to stop the vehicle when the traveling along the trajectory candidate is not permitted for all of the future actions which allow the vehicle to continue traveling.

15. The computer program product according to claim 11, wherein the instructions are configured to, when executed by the at least one processor, further cause the at least one processor to:
plan to stop the vehicle when a number of patterns of the future action whose trajectory candidate is evaluated that the traveling along the trajectory candidate is not permitted reaches an upper limit number.

16. The trajectory generation device according to claim 1, wherein
the traffic moral includes completing a passage through an intersection within a predetermined time and keeping a time to overflow into an oncoming lane within a predetermined time.

17. The method according to claim 6, wherein
the traffic moral includes completing a passage through an intersection within a predetermined time and keeping a time to overflow into an oncoming lane within a predetermined time.

18. The computer program product according to claim 11, wherein
the traffic moral includes completing a passage through an intersection within a predetermined time and keeping a time to overflow into an oncoming lane within a predetermined time.

* * * * *